United States Patent
Maes (10) Patent No.: US 7,949,569 B2
(45) Date of Patent: May 24, 2011

(54) DISTRIBUTED DEVICE INFORMATION MANAGEMENT SYSTEM AS A DISTRIBUTED INFORMATION REPOSITORY SYSTEM

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1089 days.

(21) Appl. No.: 11/669,072

(22) Filed: Jan. 30, 2007

(65) Prior Publication Data
US 2008/0183753 A1    Jul. 31, 2008

(51) Int. Cl.
*G06Q 30/00* (2006.01)
(52) U.S. Cl. ............................................ 705/26; 705/37
(58) Field of Classification Search .................. 705/26, 705/37, 26.1, 37.1
See application file for complete search history.

(56) References Cited

U.S. PATENT DOCUMENTS
7,181,438 B1 * 2/2007 Szabo ................................. 1/1

OTHER PUBLICATIONS

Infrastructure requirements for a large-scale, multi-site VLSI development project G P Rodgers, I G Bendrihem, T J Bucelot, B D Burchett, J C Collins. IBM Journal of Research and Development. Armonk: Jan. 2002. vol. 46, Iss. 1; p. 87, downloaded from ProQuestDIrect on the Internet on Jan. 12, 2001, 15 pages.*

* cited by examiner

*Primary Examiner* — James Zurita
(74) *Attorney, Agent, or Firm* — Kilpatrick Townsend & Stockton LLP (57) ABSTRACT

Information, such as information relating to the configuration and capabilities of mobile devices, can be stored in, and accessed from, a distributed, hierarchical repository system. The repository can be based on a tree structure including a plurality of levels of nodes, wherein each level corresponds to a type or source of information. The nodes also can be distributed among various entities providing the information for that node, whereby entities can retain some level of access control over the information in that node. A party requesting information then can receive information from the distributed repository based on the access conditions for that user or party, which may grant them access to information in various nodes or levels, and/or information provided by certain entities.

26 Claims, 7 Drawing Sheets

- *Prior Art* -

FIG. 1(a)

- Prior Art -

FIG. 1(b)

- Prior Art -

DISTRIBUTED DEVICE INFORMATION MANAGEMENT SYSTEM AS A DISTRIBUTED INFORMATION REPOSITORY SYSTEM

BACKGROUND OF THE INVENTION

Embodiments of the present invention generally relate to storing and accessing information from various sources, and more particularly relate to a hierarchical and distributed data repository system containing said information.

Presently, one of the most pressing problems met when developing, testing, and deploying products, applications, and/or services for devices such as mobile devices (e.g., cell phones, PDAs, mobile computer devices), and which can run on a server and/or these devices and be accessible to both, is the lack of information about the particular delivery channel or device/channel delivery context. Various properties of a mobile device, such as the operating system, amount of available or installed memory, form factor of the screen, and capabilities/type/version of the browser, are of interest to entities such as service providers or mobile application developers, as it is desirable for the service or application to function properly on the device.

This problem has been recognized by a number of entities, such as the World Wide Web Consortium (W3C) and the Open Mobile Alliance (OMA), which have tried to partially address the issue, such as by introducing the W3C WG common Rule Interchange Format for the Web which provides the ability to exchange and merge rules from different sources. Further, the Composite Capabilities/Preference Profiles (CC/PP) infrastructure can be used to describe device capabilities and user preferences, or a device's delivery context, which aids in the adaptation of content presented to a device. The User Agent Profile (UAProf) specification, for example, is one way implemented currently to concretize the CC/PP details, although the actual standards or non-standards used are not critical to the embodiments described and suggested herein. Java Specification Request (JSR) 188 provides a specification that can be used to support such mechanisms. While current such mechanisms provide access to some device/channel information, such context information is often lacking, incomplete or even incorrect.

Due to the incompleteness and inaccuracies in such information, companies and private initiatives are compiling repositories containing additional and/or hopefully more accurate information. However, these repositories often are based on information inferred on the device or channel by the owner of the repository, and may also be relatively inaccurate or incomplete. Further, these repositories inherently lag the deployment of new devices, as approaches to handling and dealing with these devices can typically only be determined after obtaining and experimenting with such a device. It is with such new devices that the problem is the most acute, as it is desirable to make sure that a brand new device is supported by a product or application, that the product or application can be accessed by the hot new device (e.g. what XSLT to use or define), and that the product or application will be useful and desirable to a particular user of this new unknown device.

Figure 1A:
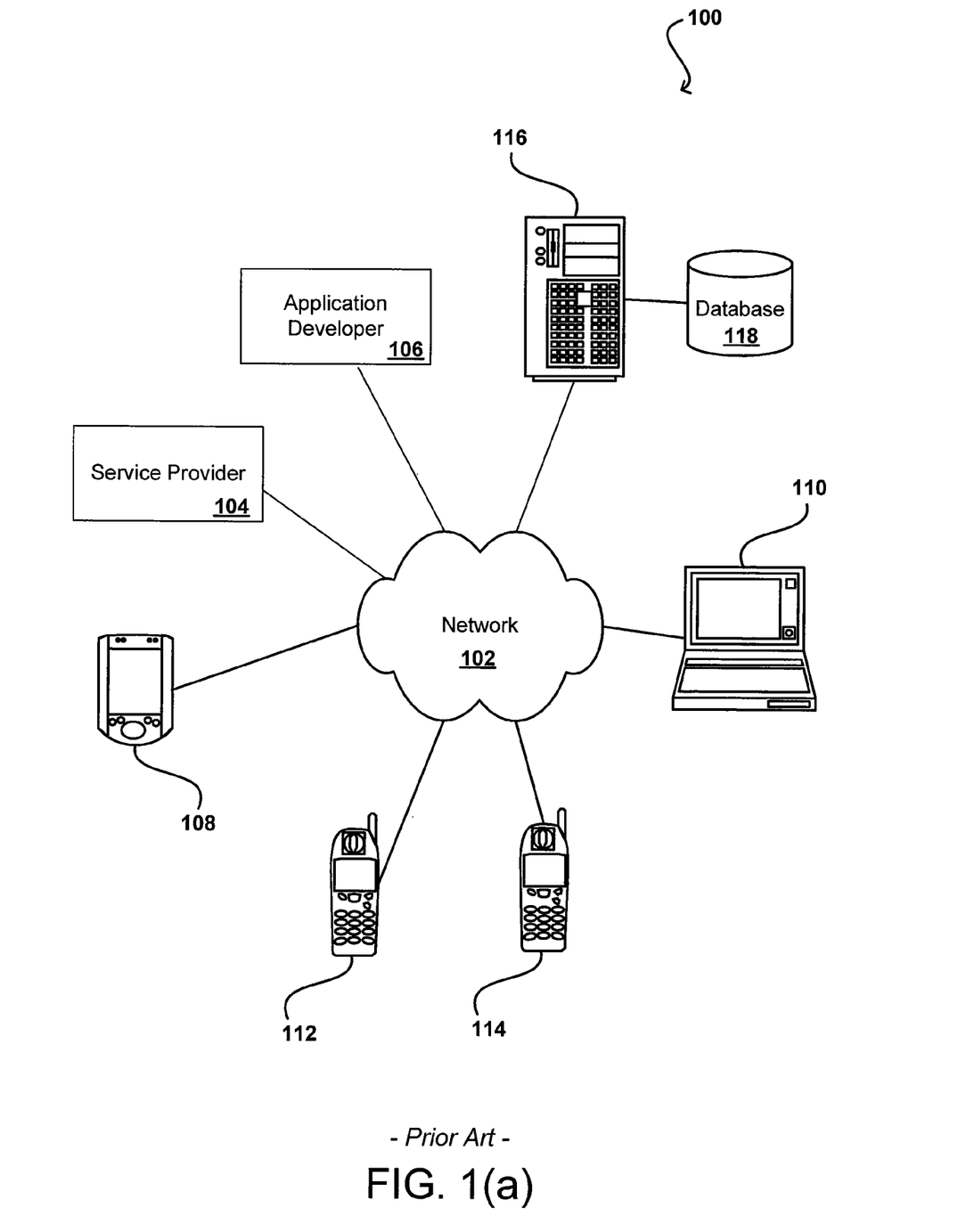

For example, an developer of applications for mobile devices typically will want to make sure that the applications run properly on as many mobile devices as possible. As shown in the configuration 100 of FIG. 1(*a*), a service provider 104 or application developer 106 might desire to have an application or service run on each of a laptop computer 110, PDA 108, and cell phone of a first provider or manufacturer 112 and a cell phone of a second manufacturer or provider 114. In one example, the application is provided by an application server 116 (or Web server or other appropriate device as known in the art) that can access data in an appropriate database 118 to provide the application over a network 102, such as a cellular network or other wireless network.

Figure 1B:
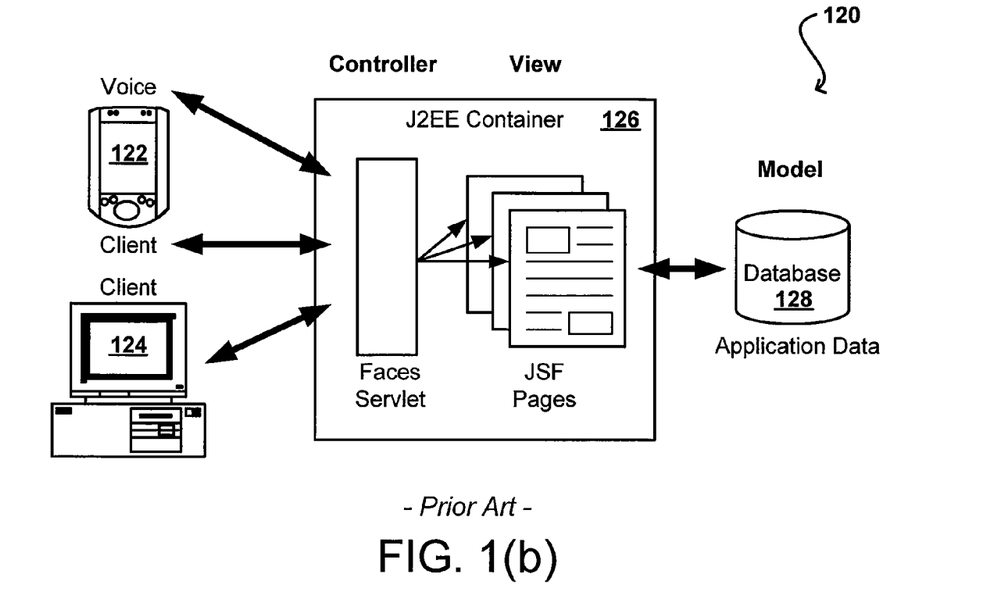
Figure 1C:
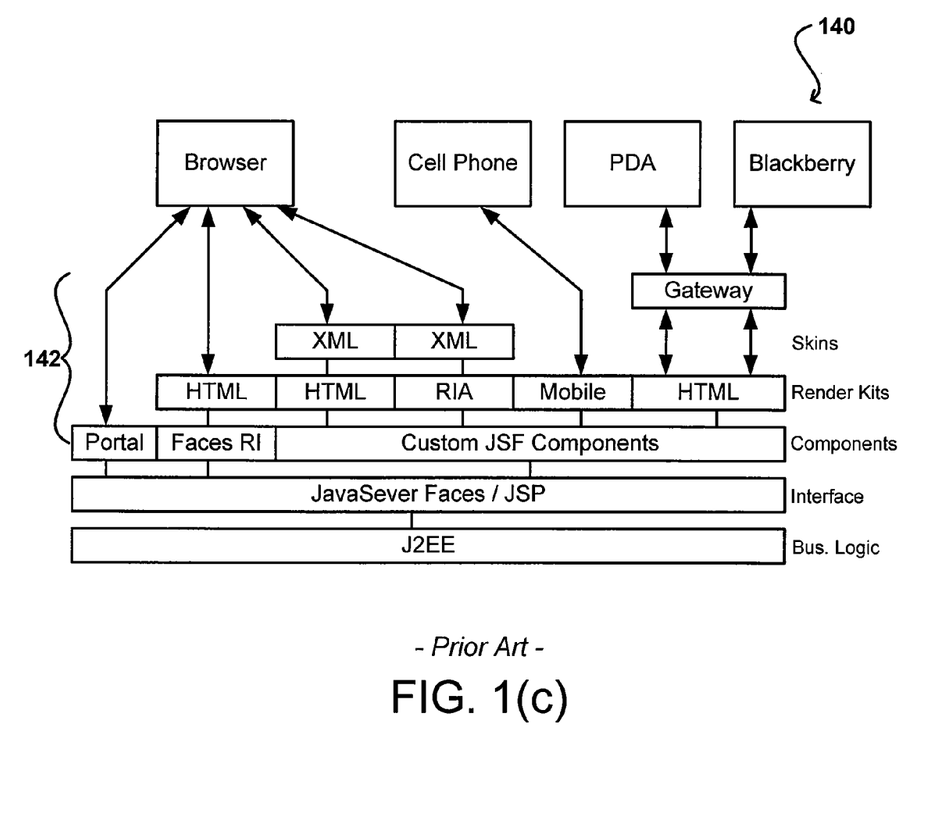

One approach currently used for device adaptation for mobile and voice access takes advantage of the fact that applications can be authored for different types of access using a single application development model, such as an ADF faces module from Oracle International Corporation of Redwood Shores, Calif., providing user interface components based on the JavaServer Faces technology. Such an approach is shown in the arrangement 120 of FIG. 1(*b*), wherein a J2EE container 126 including JSF components and having access to application database in a database 128 can serve pages for display using various clients 122, 124. Adaptation to channels and/or devices is performed via dedicated RenderKits used in the ADF cycle (such as in the Renderer). A consistent J2EE programming model then can be used for pages designated for the various devices, in an environment such as Oracle's JDeveloper, which provides end-to-end support for modeling, developing, debugging, optimizing, and deploying Java applications and Web services. Levels in such an environment are illustrated in the arrangement 140 of FIG. 1(*c*). In such an environment, phone and voice applications may rely on dedicated RenderKits, or RenderKits for Device Independence (DI) authoring and an appropriate adaptation engine in the appropriate levels 142. An ADF mobile approach built on JSF provides for a single development model across agents, using a component-based architecture. Various RenderKits can provide for agent-specific rendering. Approaches also can utilize a Java Server Faces implementation such as the open source MyFaces implementation from the Apache Software Foundation, which provides an extensive set of components, desktop and PDA RenderKits, Agent capability reporting, and skinning capabilities.

The need for such complexity comes from the fact that, unlike personal computers, which typically utilize only a handful of standard operating systems and require only a small level of compensation for different configurations, mobile devices such as PDAs and cell phones utilize many different operating systems, form factors, configurations, memory allotments, sizes, input options, etc. Further, devices from a particular manufacturer might be customized for a particular operator or provider, such that a particular cell phone model from a given manufacturer might have a different configuration when provided through a first telecommunications company than when provided through a second telecommunications company. For example, a RAZR V.3 phone from Motorola of Schaumburg, Ill. might be configured differently to work for a Verizon network setup than for a Sprint network setup, and may include different software. Further, a Nokia phone might have a different configuration for a Verizon network setup than a Sony or Ericsson phone for the same network. Further still, a user or operator might alter the configuration of the mobile device, such as by adding memory, changing the operating system, etc., as well as altering the software on the device While user customization of such devices has been relatively limited to this point, the ability to customize will continue to increase as time goes on, which may require access to information that is specific to a given device or user.

In order to provide applications or services that work as desired on multiple such devices, there then are multiple types of device information that may be worth collecting. While a device manufacturer may publish, through a specification or documentation of the device or through a device repository, information about the characteristics of the device, such as compatible networks, operating frequencies, form factor, and browser version, this information may not be accurate, as a mistake may have been made or information may not have been properly updated between releases for a given device number or model, or because the device has been further customized by an operator, user, or other party. Further, for business reasons, the device manufacturer may not necessarily be interested in providing all the information about the device, or providing completely accurate information. As a result, other service providers or vendors have found it advantageous to collect information about these device themselves. These entities may build databases themselves that contain at least some of the data obtained from the manufacturer, as well as information that these entities have obtained themselves about the devices, such as through testing and experimentation. These entities often sell this information to other service providers, application providers, or vendors who want to build applications or provide services that can be adapted appropriately to the device. When the information is device and/or user specific, however, regulatory and/or privacy considerations may prevent or limit the providing of full and/or unprotected/uncontrolled access to such information.

Even though these entities may collect additional information, they still may not provide accurate or up-to-date information for all devices, particularly where those devices are customized by a user or operator. Even if the information is correct for a particular manufacturer or vendor, the information may not be accurate for particular devices.

BRIEF SUMMARY OF THE INVENTION

Systems and methods in accordance with various embodiments of the present invention can overcome these and other deficiencies in existing information repositories and information services by changing the way in which data is stored and accessed, such as for the field of devices, device capabilities, and device properties. In one embodiment, information is stored in a hierarchical, distributed repository system. This system allows various entities to provide information while maintaining control over the information. Further, a party such as developer or vendor requesting such information can pay for, or request, access to as many levels or nodes in the hierarchy as necessary and/or desired.

In one embodiment, a root node is provided at a first location associated with a first entity, the root node containing information about a tree structure of the repository system. A plurality of levels of nodes also is provided, with each level corresponding to one of a type and a source of information contained at nodes of the respective level. Each node other than the root node is linked to a node at a higher level in the tree structure. Portions of the nodes of the tree structure are located at second and third locations associated with second and third entities, respectively. Each node is operable to tag any information obtained from that node with source information, allowing the user to determine the source of the information for purposes such as conflict resolution. Each of the first, second, and third entities is also provided with configurable access parameters, whereby each of the first, second, and third entities are able to control access by a user to any nodes of the tree structure controlled by that entity.

Information stored in such a hierarchical repository system can include information relating to a mobile device. The second and third entities then can include entities such as manufacturers, service providers, operators, users, vendors, and third parties. The information contained in the nodes then can include information such as processor speed, operating frequency, available memory, operating system, form factor, screen size, and browser capabilities.

In one embodiment, a distributed, hierarchical repository system for providing information includes a master server at a first location that is associated with a first entity. The master server provides a root node containing information about a tree structure of the repository system, and is operable to receive user requests for information and retrieve information in response thereto. A plurality of data servers in the system are in communication with the master server, with portions of the plurality of data servers being located at second and third locations associated with second and third entities, respectively. Additional data servers and entities can be included as desired. The plurality of data servers provide a plurality of levels of nodes in the tree structure, with each level corresponding to a type and/or source of information contained at nodes of the respective level. Each node other than the root node is linked to a node at a higher level in the tree structure. Each data server is able to tag information obtained from a respective node with source information. The master server can provide each of the first, second, and third entities with configurable access parameters whereby each of the first, second, and third entities are able to control access by a user of the repository system to any nodes of the tree structure controlled by that entity.

In one embodiment, information is provided by first receiving a request for information to a root node of a repository system, with the request including identifying information for the source of the request. A set of nodes and levels containing information corresponding to the request is determined. The root node contains information about a tree structure of the repository system including a plurality of levels of nodes distributed across a network. Each level corresponds to a type and/or source of information contained at nodes of the respective level, with each node other than the root node being linked to a node at a higher level in the tree structure. A subset of the set of nodes and levels is determined to which the request has access based on the identifying information. Any information corresponding to the request from the subset of nodes and levels to which the request is determined to have access is tagged with source information. A response is generated with the tagged information and returned to the requestor.

The nodes (i.e., sources of information) also can be the object of a rating system for the users. In such a case, the information may be tagged by, for example, source and/or rating for the information.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which:

FIGS. 1(*a*)-1(*c*) illustrate arrangements of the prior art;

DETAILED DESCRIPTION OF THE INVENTION

Systems and methods in accordance with various embodiments of the present invention provide for the storage and access of information, such as device information, from a hierarchical repository system. This repository system can be distributed, such that various entities can provide the nodes and/or levels of the hierarchical system. The distribution of the repositories allows information to be more current and accurate from particular information sources, and allows each source to maintain a level of control and access to the particular information. Entities then can obtain access to specific levels and/or nodes of the hierarchy, in order to obtain a desired or necessary level of information. Information can come from multiple sources. Rating of the source or information (as provided by others) also can be provided.

Such a repository can be widely distributed with one or more root repositories. By allowing the repository to be distributed, various entities or information sources can contribute to the repository. These entities can include, for example, companies that collect such information by inference, operators, providers, manufacturers, users, third parties, or other companies or entities.

Further, allowing the repository to be distributed allows appropriate validation and/or certification mechanisms to be used at any portion of the depository. Other non-certified information also may be allowed if clearly identified as such and appropriately managed. For example, nodes or sources of information may be the object of rating systems, including ratings provided by the users or other appropriate sources. The information may be tagged, such as by an identification of the source, a rating of the source, and/or a rating of the material itself.

A distributed repository also allows entities controlling or providing portions of the repository to control access to, and monetize, some information. In one example, privacy and/or regulatory considerations may restrict access to such information or provide anonymization of the delivery context in response to authorized requests. In another example, each entity controlling or providing a portion of the repository can charge for access to the information, such as on a per-use or subscription basis.

Further still, the distributed repository can be hierarchical. This can allow information to be stored from a global level down to a very specific level, such as a user- or device-specific level, whereby information can easily be obtained to a particular level of detail. This also allows for an entity requesting information to be charged per the level of detail requested.

Figure 2:
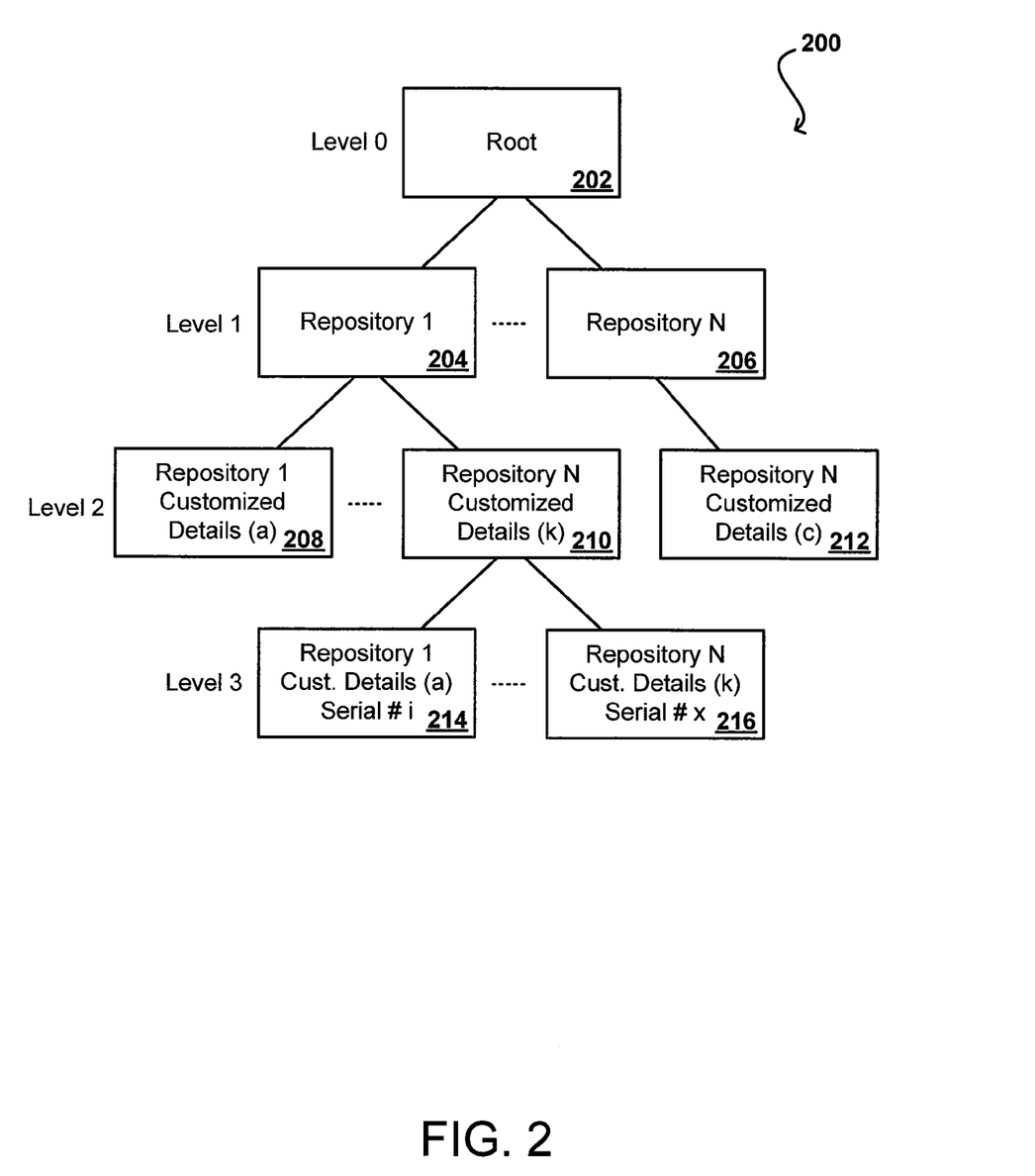
FIG. 2 illustrates a repository hierarchy that can be used in accordance with one embodiment of the present invention.

FIG. 2 illustrates an example of a hierarchical repository structure 200 that can be used in accordance with one embodiment of the present invention. In this structure 200, a root node 202 is provided that allows an entity requesting access to navigate to the relevant information. This root node can include any appropriate information about the various nodes, levels, sources, providers, etc., as needed. Further, the root node may have associated with it various access and security rules that allow access to the overall repository. The root node may be located anywhere on the distributed network, and may be controlled and/or provided by an entity controlling the overall repository structure 200. The root node may be considered to be at Level 0 of the hierarchy, as the root node typically will not contain any information to be accessed, such as information about particular device characteristics, but will instead contain information about the distributed, hierarchical structure itself.

"Below" the root node 202 at Level 0 can be at least one Level 1 Repository 204, 206, wherein each Level 1 Repository can be separated based on any appropriate criteria, such as information source, topic, category, provider, class, relationship, rating, other meta data, etc. In an example discussed later herein regarding mobile devices, each Level 1 repository can correspond to a manufacturer of at least one mobile device. In such an example, an entity requesting information may request information from all of Level 1, corresponding to all repositories and manufacturers included in Level 1, and/or can request information from any of the repositories corresponding to any particular manufacturers.

"Below" the Level 1 repositories in the hierarchical structure can be at least one Level 2 repository 208, 210, 212, where each Level 1 repository can have zero, one, or more Level 2 repositories containing additional and/or updated information for that particular Level 1 repository. In the example discussed below, the Level 2 repositories can each include information for a service provider, such as a telecommunications network provider, that includes customization information for that provider as it relates to the particular manufacturer of the corresponding Level 1 repository. As can be seen for the manufacturer corresponding to Repository 1 204, there can be at least two repositories 208, 210 corresponding to different providers, where each provider updates or provides additional information for devices of that manufacturer as configured for, or used with, that provider's service. An entity having access to Level 2 information then can obtain information not only for various manufacturers, but also information as to how each service provider customizes devices from those manufacturers. An entity can choose to obtain information for all service providers, or particular providers, assuming the entity has been granted access by any respective provider and/or manufacturer. In some embodiments, an entity requesting information may not have access to information from a manufacturer, or a particular Level 1 repository, but still can obtain information from service providers or Level 2 repositories corresponding to that manufacturer or Level 1 repository. In some cases each Level 2 repository will contain the same fields of information as contained in the corresponding Level 1 repository, just updated where appropriate. In other cases, the Level 2 repository may have some or no overlapping data fields with the corresponding Level 1 repository.

The hierarchical structure propagate on until a bottom level is reached as deemed appropriate. In the structure of FIG. 2, the bottom level is Level 3, although it should be understood that any number of levels could be in the hierarchical tree structure as would be apparent to one of ordinary skill in the art in light of the teachings and suggestions contained herein. Here, each Level 2 repository can have zero, one, or more Level 3 repositories 214, 216. In the mobile device example, these Level 3 repositories can correspond to information for specific devices, such as may be classified by device serial number. Each user or each device may determine whether this information is exposed or available to various entities via the structure. An entity then can decide whether they want access to information for all users or devices granting access, a class of users or devices granting access, and/or particular users or devices granting access. Each information field may be associated to source, rating, or other meta data, for example.

Figure 3:
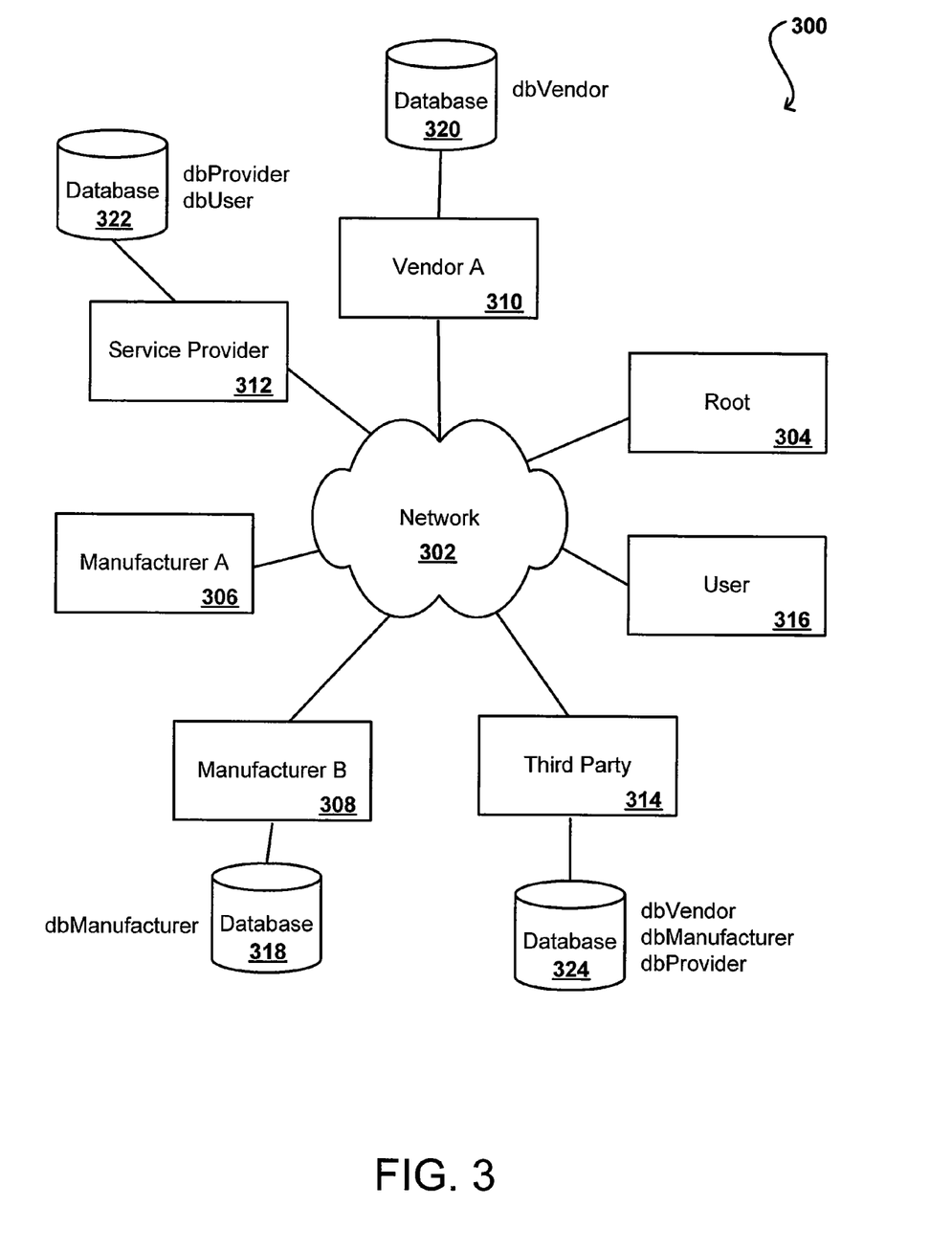
FIG. 3 illustrates a system for providing a repository hierarchy that can be used in accordance with one embodiment of the present invention.

As discussed above, the hierarchical structure of FIG. 2 also can be distributed across a network 302 or system, and can be controlled and/or provided by various entities, modules, providers, etc., across the network or system. For example, FIG. 3 illustrates a distributed repository configuration 300 wherein various entities can be located at various locations, each capable of hosting at least one repository of the distributed structure. In this particular example, the root node 304, or root repository, is located at one location, such as may be provided by the entity managing the distributed system. Manufacturers A 306 and B 308, each of which manufacture a mobile device for which information is to be stored in the structure, each of which can control or provide a database 318 that can contain information for that manufacturer's devices. These databases would correspond to Level 1 repositories of the example of FIG. 2. Each manufacturer can decide how much information to provide, can control who has access to the information, and can charge an amount of money for the information as appropriate. The amount charged may be set by, for example, the manufacturer, the repository structure controlling entity, a subscription controlling entity, or a combination thereof.

As discussed above, a number of layers may be below the Layer 1 repository, such as a layer (e.g., Layer 2) of repositories provided by service providers 312, vendors 310, and/or third parties 314, each of which can provide data from a corresponding database 322, 320, 324. Each of these repositories can provide information for at least one of the repositories in the layer above, such as for a device of Manufacturer A. A third party 314 might include information corresponding to any of the vendors, manufacturers, and/or providers, for example, regardless of the layer of those entities.

At a bottom layer, such as Level 3 in FIG. 2, information may be contained in repositories for individual devices and/or users 316. While it is possible for each user device to contain a repository that is shared over the network, practical issues such as memory, bandwidth, and connectivity make this impractical in many applications. As such, data for any user and/or device can be contained in a repository at an appropriate location, such as may be provided by the respective service provider 312 for that user or device. For example, a Verizon repository might provide information for a particular mobile device having service through a Verizon network, or for a user subscribing to a Verizon service. In some examples, a user might use multiple devices, or a device might have multiple users, with different customizations/applications for each, such that it makes sense to track users and devices separately.

In this way, an entity requesting information can have access to any repository distributed across the network by connecting simply through the root node 304 in one embodiment. Each entity providing information, however, is able to protect access to their data, and can ensure, for example, that proper payment is received for such access. Methods for tracking access to data and managing subscriptions to data are known in the art, as are methods for providing secure access to data, such that these methods will not be discussed herein in detail.

Such a system can be a generic distributed repository solution, such as may contain a mobile device root repository including any information relevant to the support of the mobile web and mobile enablers. Other roots such as a web root channel and device repository can be established with focus on other branches (e.g. web devices/user agent, industrial devices, set top boxes, etc. . . . ). Such a repository cannot only address a major challenge of the mobile web, for example, but can accelerate convergence with the web by provided a universal way to access and use delivery/context information for all devices and/or channels, whether mobile, pervasive, or other.

A generic distributed information repository such as in the example of FIG. 2 can maintain one or many roots. If multiple roots are maintained, the roots may or may not have to trust the other roots. When the roots are trusted, the roots may try to reproduce the same information by periodic synchronization or replication (at least of the child nodes), or by event-based synchronization (at least of the child nodes). The information to be synchronized may itself be filtered. When no relationship exists, a node can still copy publicly available children. The user may then be notified that information may be outdated and incomplete.

Such a repository can be hierarchically searched for information such as mobile device information. For example, a search can be done in a per device model, such as provided by device manufacturers of as collected/needed by service providers. A search also can be done per customized device models, such as customized by service providers or operators, enterprises, and/or users. A search also can be done per device or user where authorized by or for a user. It therefore can be important that a node in the hierarchical tree, particularly the root node, not only contains the relevant information but also the address, or another link or connection, to the respective child repositories. Further, information from different levels, nodes, and or sources can be tagged by the origin of that information to allow a requester to decide how to deal with conflicting information, as well as to allow a user to assign a level of trust or reliability to that information. It can also be tagged with a rating obtained about the source of the information, for example.

Figure 4:
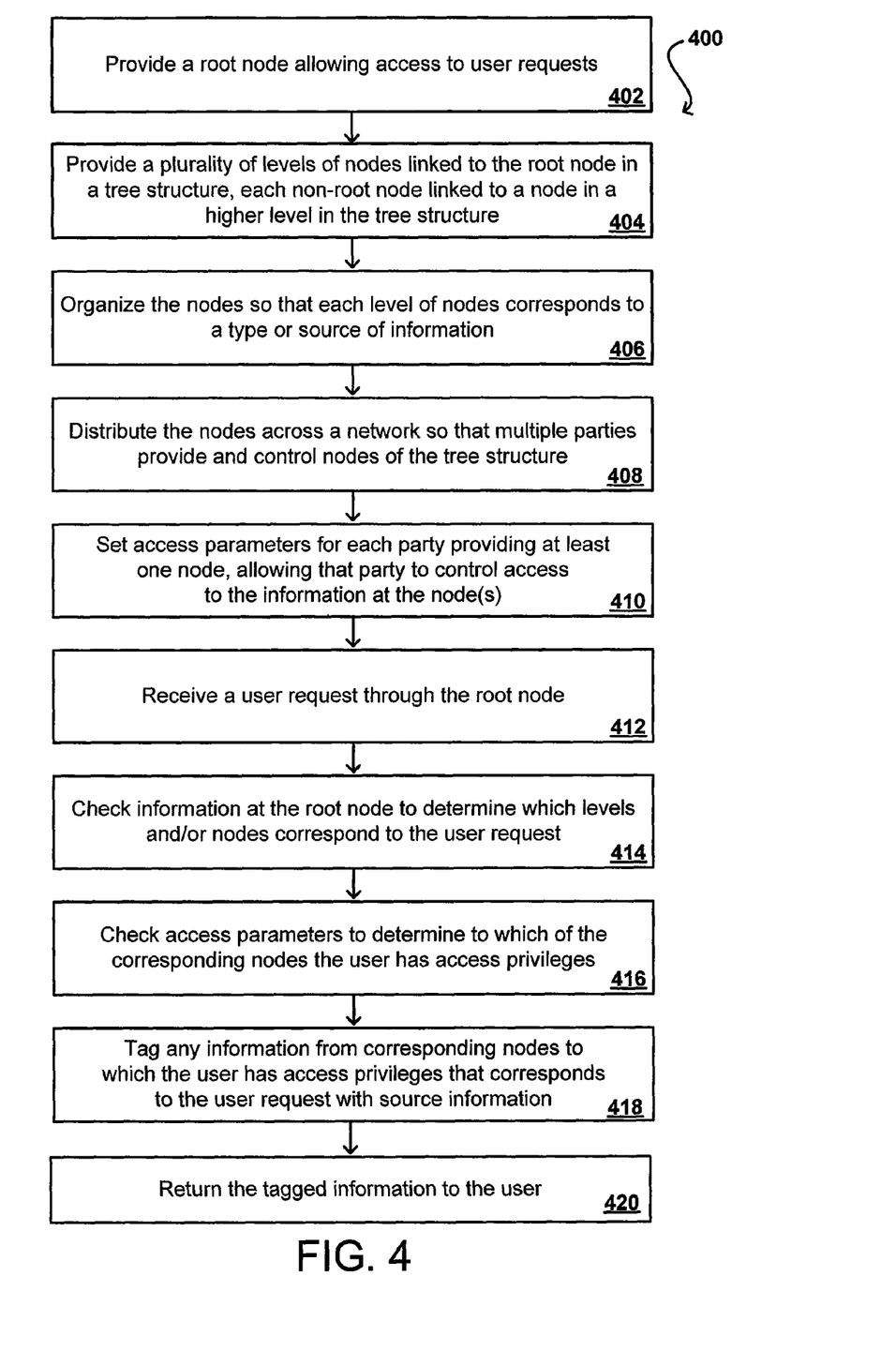
FIG. 4 illustrates steps of an exemplary method that can be used in accordance with one embodiment of the present invention.

FIG. 4 illustrates steps of an exemplary method 400 for providing a distributed, hierarchical repository that can be used in accordance with one embodiment of the present invention. In this method, a root node is provided allowing access to authorized users 402. A plurality of levels of nodes is provided that are linked to the root node in a tree structure, wherein each node other than the root node is linked to at least one node in a higher level of the structure 404. The nodes are organized so that each level of nodes corresponds to a type or source of information 406. The locations of the nodes are distributed across a network, allowing multiple parties to control nodes of the structure 408. Access parameters can be set by each party providing at least one node on the system, allowing that party to control access to the information that party provides via the node 410. A user request for information is received through the root node 412. Information at the root node is checked for the user to determine to which levels and/or nodes of information corresponds to a request or query from the user 414. Access parameters are checked for the user to determine to which of the nodes corresponding to the request does the user have access privileges 416. Any information from a node corresponding to the query to which the user has access privileges, and which corresponds to the request, is tagged with source information 418, and can be tagged with rating and other meta data. The tagged source information then is returned to the user 420. It should be noted that the timing of the source information tagging can be at any other appropriate time in the process, such as before a user request is received.

It also should be noted that policies can be applied to any request on a node. As policies are any combination of conditions and action, appropriate scripts can filter out or transform information returned on any request. This can be used to perform access control, charging, and enforcement of privacy rules. Using polices can allow certain levels to require authorization and/or a subscription. For example, additional information may be provided by a third party device profile service provider as part of a fee-based subscription. User specific information also can be subject to privacy-based policies. Policies can be used for certain information that may be customized for specific purposes (and therefore not as useful as others), and can allow device manufacturers or operators to expose settings only to partners under NDA, etc.

As the overall repository is distributed, each node may be maintained by the appropriate actor (e.g. a device manufacturer, operator, enterprise, user, or third party). Data entry for each node can be performed by an authorized administrator of the node or parties that are authorized by policies. The actors also can ensure that child node addresses are included in the nodes in some embodiments, while the root node contains all relationships in other embodiments. Nodes also can be found by simply walking the tree structure.

Ideally information would be provided by the device and user agent manufacturers. While this has been an issue in the past, industry pressure resulting from the establishment of such an industry-wide repository may provide enough incentives to overcome these challenges. The ability to have accurate information allows entities such as application developers and service providers to remove or modify features that cannot run on a particular device, or adapt the look and feel to fit the form factor (e.g., split to multiple pages, change aspect ratio, etc.) The delivery context information therefore can encompass all information relevant to the development, testing, deployment and/or debugging of mobile products, applications, and/or services. It also need not be limited to web-centric or web-relevant information.

In one embodiment, an entity requesting information for a specific device can simply submit a request or query including an identifier for that device, such as the MAC Address or EMEI or MSISDN for a particular device in order to configure delivery context mapping for that particular device. The entity then can get information relevant to that device down to the lowest level to which the entity has access, or from specific levels to which the entity has access. The entity then can receive as much information as possible that has been obtained and provided by many different parties. The information could come from the original information from the high level global repository, information from the manufacturer, info from the operator about the customization, and additional information that has been collected by a third party, for example. If the entity is authorized, either by the operator or by the user, the entity may even be able to obtain information about the history of a particular device or particular user.

An issue that can arise when obtaining information from multiple sources is the presence of conflicting information. For example, a device manufacturer might indicate that a certain device shipped with a first browser, and the third party information or operator information says that the device currently has a second browser installed. In such a case, the repository system may not include any conflict checking or resolution, such that it is up to the entity or application accessing the information to decide how to handle the conflict. In one example, an application can decide to use information from a third party, which is more likely to be current than from the original manufacturer, can choose to use the data that is more recent, or can use any other appropriate method or rule(s) to resolve conflicts as know in the art. If the data is tagged with source information as described above, the requestor can easily resolve conflicts based on the identity in the source tags and/or rating of sources of information by previous users. A requestor can setup conflict resolving rules based on these tags, such as information from source A always taking precedent over information from source B, so that the requestor's system can automatically handle most conflicts. A rating in one embodiment is essentially a set of side annotations that are worth associating with the data returned in response to a request. The rating may be stored with the data or stored in another repository (hierarchical or not), and can be accessed by the user to add the tags to the retrieved data.

If possible, a system or application can also poll the actual device for the current information in the event of a conflict. This polling can take some time, however, and should be limited to cases where the conflict cannot be otherwise resolved.

In an example, a manufacturer may indicate that the device ships with browser v3.0, an operator says v3.5, and a third party says that it is actually v2.0. Since the entity has access to all this information, the entity may decide to use v2.0 as the information, where an application for v2.0 will work on the other versions. Alternatively, the entity may wish to use the v3.5 information as it is likely to be the most recent upgrade. If customization is not done from one user to another, the entity may choose to use the manufacturer data and simply plan for v3.0. If the third party is a trusted provider, such as there is a subscription and the information is known to be accurate, the entity might trust the or third party. An entity identifying conflicting information also can be a third party provider and provide the correct information, once obtained or determined, at an appropriate node in the hierarchy.

Figure 5:
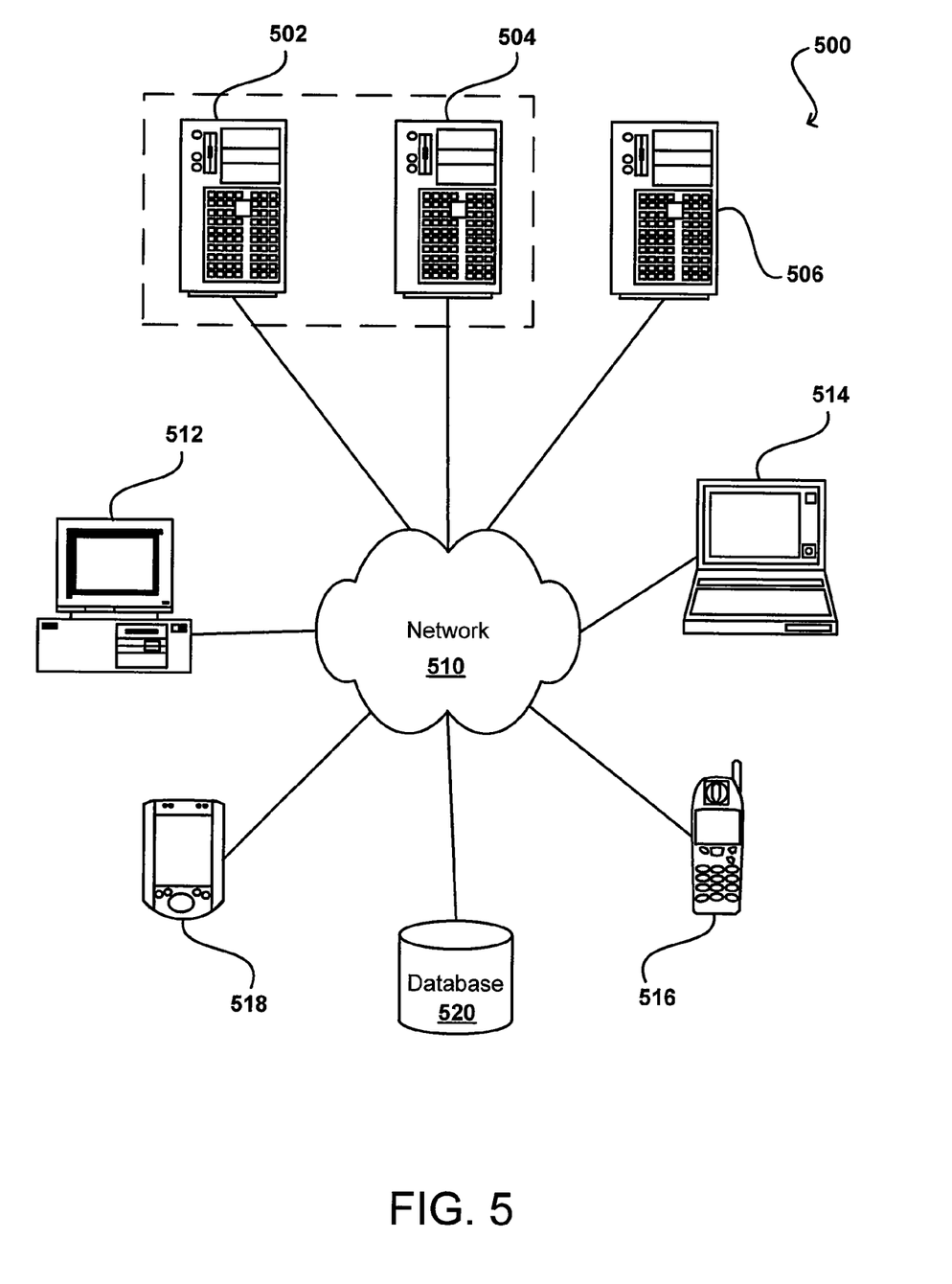
FIG. 5 illustrates components of a computer network that can be used in accordance with one embodiment of the present invention.

FIG. 5 is a block diagram illustrating components of an exemplary operating environment in which various embodiments of the present invention may be implemented. The system 500 can include one or more user computers, computing devices, or processing devices 512, 514, 516, 518, which can be used to operate a client, such as a dedicated application, web browser, etc. The user computers 512, 514, 516, 518 can be general purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 512, 514, 516, 518 may also have any of a variety of applications, including one or more development systems, database client and/or server applications, and Web browser applications. Alternatively, the user computers 512, 514, 516, 518 may be any other electronic device, such as a thin-client computer, Internet-enabled gaming system, and/or personal messaging device, capable of communicating via a network (e.g., the network 510 described below) and/or displaying and navigating Web pages or other types of electronic documents. Although the exemplary system 500 is shown with four user computers, any number of user computers may be supported.

In most embodiments, the system 500 includes some type of network 510. The network may can be any type of network familiar to those skilled in the art that can support data communications using any of a variety of commercially-available protocols, including without limitation TCP/IP, SNA, IPX, AppleTalk, and the like. Merely by way of example, the network 510 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 502, 504, 506 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 506) may be dedicated to running applications, such as a business application, a Web server, application server, etc. Such servers may be used to process requests from user computers 512, 514, 516, 518. The applications can also include any number of applications for controlling access to resources of the servers 502, 504, 506.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 512, 514, 516, 518. As one example, a server may execute one or more Web applications. The Web application may be implemented as one or more scripts or programs written in any programming language, such as Java, C, C# or C++, and/or any scripting language, such as Perl, Python, or TCL, as well as combinations of any programming/scripting languages. The server(s) may also include database servers, including without limitation those commercially available from Oracle, Microsoft, Sybase, IBM and the like, which can process requests from database clients running on a user computer 512, 514, 516, 518.

The system 500 may also include one or more databases 520. The database(s) 520 may reside in a variety of locations. By way of example, a database 520 may reside on a storage medium local to (and/or resident in) one or more of the computers 502, 504, 506, 512, 514, 516, 518. Alternatively, it may be remote from any or all of the computers 502, 504, 506, 512, 514, 516, 518, and/or in communication (e.g., via the network 510) with one or more of these. In a particular set of embodiments, the database 520 may reside in a storage-area network ("SAN") familiar to those skilled in the art. Similarly, any necessary files for performing the functions attributed to the computers 502, 504, 506, 512, 514, 516, 518 may be stored locally on the respective computer and/or remotely, as appropriate. In one set of embodiments, the database 520 may be a relational database, such as Oracle 10g, that is adapted to store, update, and retrieve data in response to SQL-formatted commands.

Figure 6:
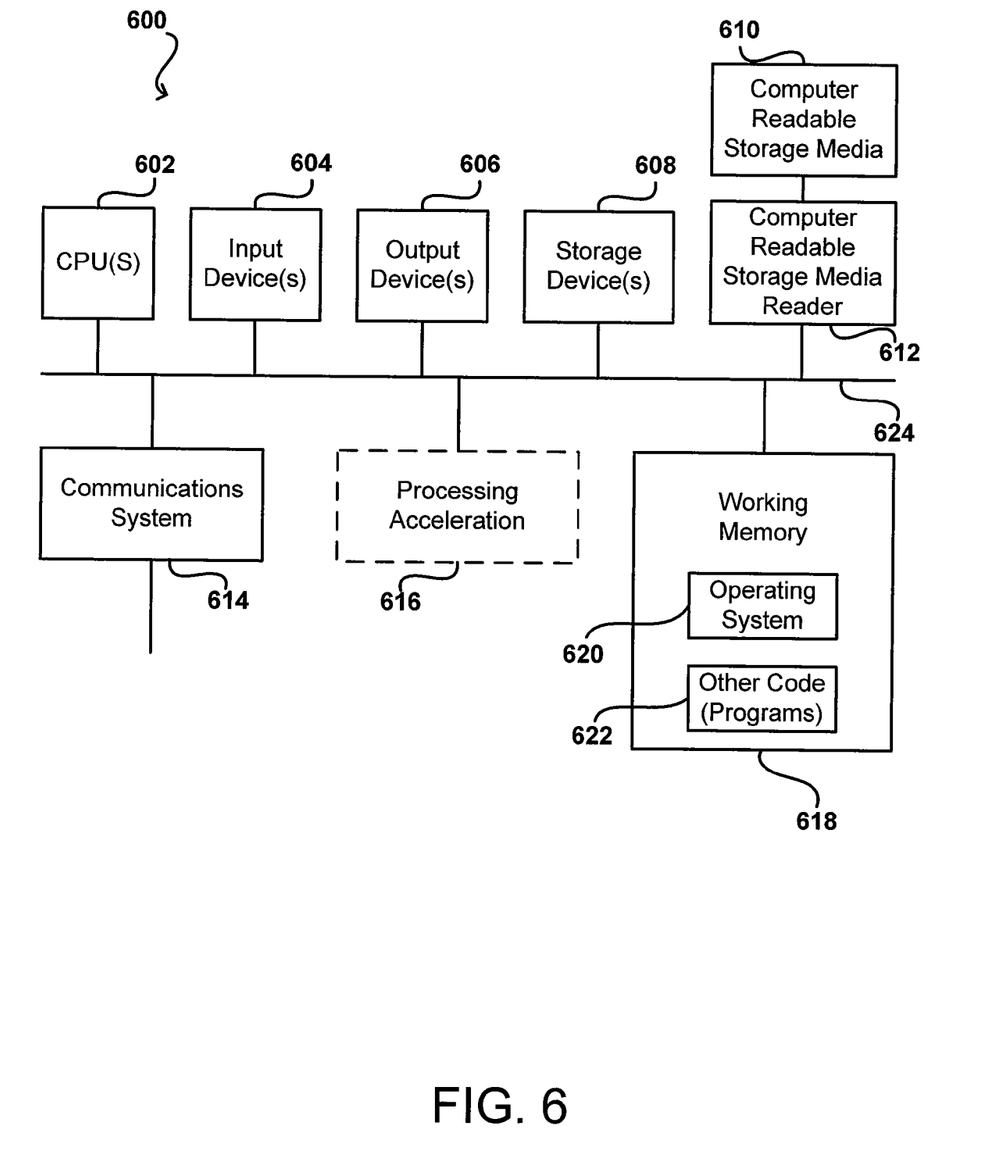
FIG. 6 illustrates components of a computerized device that can be used in accordance with one embodiment of the present invention.

FIG. 6 illustrates an exemplary computer system 600, in which various embodiments of the present invention may be implemented. The system 600 may be used to implement any of the computer systems described above. The computer system 600 is shown comprising hardware elements that may be electrically coupled via a bus 624. The hardware elements may include one or more central processing units (CPUs) 602, one or more input devices 604 (e.g., a mouse, a keyboard, etc.), and one or more output devices 606 (e.g., a display device, a printer, etc.). The computer system 600 may also include one or more storage devices 608. By way of example, the storage device(s) 608 can include devices such as disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 612, a communications system 614 (e.g., a modem, a network card (wireless or wired), an infra-red communication device, etc.), and working memory 618, which may include RAM and ROM devices as described above. In some embodiments, the computer system 600 may also include a processing acceleration unit 616, which can include a digital signal processor DSP, a special-purpose processor, and/or the like.

The computer-readable storage media reader 612 can further be connected to a computer-readable storage medium 610, together (and, optionally, in combination with storage device(s) 608) comprehensively representing remote, local, fixed, and/or removable storage devices plus storage media for temporarily and/or more permanently containing computer-readable information. The communications system 614 may permit data to be exchanged with the network and/or any other computer described above with respect to the system 600.

The computer system 600 may also comprise software elements, shown as being currently located within a working memory 618, including an operating system 620 and/or other code 622, such as an application program (which may be a client application, Web browser, mid-tier application, RDBMS, etc.). It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for managing device information, the method comprising:

providing by a first computer a root node of a distributed repository, the root node associated with a first entity, the root node containing information about a tree structure representing a hierarchy of the distributed repository system;

providing by at least one second computer a plurality of levels of nodes in the hierarchy of the distributed repository, each level corresponding to one of a type and a source of device information contained at nodes of the respective level, each node other than the root node being linked to a node at a higher level in the tree structure, the device information including information for each of a plurality of different end devices;

locating by the first computer system the nodes of the distributed repository provided by the at least one second computer and associated with second and third entities;

allowing by the at least one second computer each node of the distributed repository to tag information obtained from that node with source information; and providing by the first computer system and the at least one second computer system each of the first, second, and third entities with configurable access parameters whereby each of the first, second, and third entities are able to control access by a user to any nodes of the distributed repository controlled by that entity.

2. The method according to claim 1, wherein:

allowing further comprises allowing each node to tag information obtained from that node with rating information and related metadata.

3. The method according to claim 1, wherein:

allowing tags information obtained from that node with source information by storing the source information in a data store and associating the source information at the time of a request.

4. The method according to claim 1, wherein:

the device information stored in the distributed repository includes information relating to a mobile device.

5. The method according to claim 4, wherein:

at least one of the second and third entities is selected from the group consisting of manufacturers, service providers, operators, users, vendors, and third parties.

6. The method according to claim 5, wherein:

the device information includes information selected from the group consisting of processor speed, operating frequency, available memory, operating system, form factor, and browser capabilities.

7. The method according to claim 1, further comprising:

providing each user of the distributed repository with a set of access parameters that can be used to access a subset of information in the distributed repository via the root node, the subset being determined in part by the configurable access parameters.

8. The method according to claim 7, further comprising:

allowing a user to subscribe to information contained in at least one of a level or a node of the distributed repository.

9. The method according to claim 7, further comprising:

allowing a user to subscribe to information provided by any of the first, second, and third entities.

10. The method according to claim 1, further comprising:

charging a user for access to at least one of a node and a level of the hierarchy of the distributed repository.

11. The method according to claim 1, further comprising:

allowing a user to resolve conflicts in information in the response using the source information.

12. A system for providing device information, the system comprising:

a first server at a first location and associated with a first entity, the first server providing a root node of a distributed repository and containing information about a tree structure representing a hierarchy of the distributed repository, the first server being further operable to receive user requests for information and retrieve information in response thereto; and second and third servers in communication with the first server, the second and third servers being located at second and third locations associated with second and third entities, respectively, the second and third servers providing a plurality of levels of nodes in the hierarchy of the distributed repository, each level corresponding to one of a type and a source of device information contained at nodes of the respective level, each node other than the root node being linked to a node at a higher level in the hierarchy, each of the second and third servers being further operable to tag information obtained from a respective node with source information, the device information including information for each of a plurality of different end devices;

wherein the first server is further operable to provide each of the first, second, and third entities with configurable access parameters whereby each of the first, second, and third entities are able to control access by a user of the distributed repository to any nodes of the distributed repository controlled by that entity.

13. The system according to claim 12, wherein:

each of the second and third servers is further operable to tag information obtained from a respective node with rating information and related metadata.

14. The system according to claim 12, wherein:

the device information stored in the distributed repository includes information relating to a mobile device.

15. The system according to claim 14, wherein:

at least one of the second and third entities is selected from the group consisting of manufacturers, service providers, operators, users, vendors, and third parties.

16. The system according to claim 14, wherein: the device information includes information selected from the group consisting of processor speed, operating frequency, available memory, operating system, form factor, and browser capabilities.

17. The system according to claim 12, wherein:

the source information allows a user to resolve conflicts in device information obtained from different nodes.

18. A method for providing information in a distributed, hierarchical repository system, comprising:

receiving by a first server a request for information from a distributed repository, the request including identifying information for the source of the request, the first server maintaining a root node of the distributed repository;

determining by the first server a set of nodes and levels containing information corresponding to the request, the root node containing information about a tree structure representing a hierarchy of the distributed repository including a plurality of levels of nodes distributed across a network, each level corresponding to one of a type and a source of device information contained at nodes of the respective level, each node other than the root node being linked to a node at a higher level in the hierarchy of the distributed repository, the device information including information for each of a plurality of different end devices;

determining by at least one second server a subset of the set of nodes and levels of the hierarchy of the distributed repository to which the request has access based on the identifying information;

tagging by the at least one second server any information for the request from the subset of nodes and levels to which the request is determined to have access with source information; and generating by the at least one second server a response including the tagged information.

19. The method according to claim 18, wherein: tagging further comprises tagging any information for the request from the subset of nodes and levels to which the request is determined to have access with rating information and related metadata.

20. The method according to claim 18, wherein: the first server is located at a first location associated with a first entity and the at least one second server is located at a second location associated with a second entity.

21. The method according to claim 20, wherein: the device information stored in the distributed repository includes information relating to a mobile device.

22. The method according to claim 21, wherein: the second entity is selected from the group consisting of manufacturers, service providers, operators, users, vendors, and third parties.

23. The method according to claim 22, wherein: the device information includes information selected from the group consisting of processor speed, operating frequency, available memory, operating system, form factor, and browser capabilities.

24. The method according to claim 18, further comprising: providing each user of the distributed repository with a set of access parameters that can be used to access a subset of information in the distributed repository via the root node, the subset being determined in part by the configurable access parameters.

25. The method according to claim 24, further comprising: allowing a user to subscribe to information contained in at least one of a level or a node of the distributed repository.

26. The method according to claim 18, further comprising: allowing a user to resolve conflicts in information in the response using the source information.

* * * * *

UNITED STATES PATENT AND TRADEMARK OFFICE
CERTIFICATE OF CORRECTION

| | | |
|---|---|---|
| PATENT NO. | : 7,949,569 B2 | |
| APPLICATION NO. | : 11/669072 | |
| DATED | : May 24, 2011 | |
| INVENTOR(S) | : Maes | |

It is certified that error appears in the above-identified patent and that said Letters Patent is hereby corrected as shown below:

In column 14, line 45-49, delete "16. The system according to claim 14, wherein: the device information includes information selected from the group consisting of processor speed, operating frequency, available memory, operating system, form factor, and browser capabilities." and
insert -- 16. The system according to claim 14, wherein:
the device information includes information selected from the group consisting of processor speed, operating frequency, available memory, operating system, form factor, and browser capabilities. --, therefor.

In column 15, line 13-17, delete "19. The method according to claim 18, wherein: tagging further comprises tagging any information for the request from the subset of nodes and levels to which the request is determined to have access with rating information and related metadata." and
insert -- 19. The method according to claim 18, wherein:
tagging further comprises tagging any information for the request from the subset of nodes and levels to which the request is determined to have access with rating information and related metadata. --, therefor.

In column 15, line 18-21, delete "20. The method according to claim 18, wherein: the first server is located at a first location associated with a first entity and the at least one second server is located at a second location associated with a second entity." and
insert -- 20. The method according to claim 18, wherein:
the first server is located at a first location associated with a first entity and the at least one second server is located at a second location associated with a second entity. --, therefor.

In column 16, line 5-9, delete "23. The method according to claim 22, wherein: the device information includes information selected from the group consisting of processor speed, operating frequency, available memory, operating system, form factor, and browser capabilities." and
insert -- 23. The method according to claim 22, wherein:
the device information includes information selected from the group consisting of processor speed, operating frequency, available memory, operating system, form factor, and browser capabilities. --, Signed and Sealed this
First Day of November, 2011

David J. Kappos
*Director of the United States Patent and Trademark Office* therefor.